UNITED STATES PATENT OFFICE.

ZANE BLAND TAYLOR, OF ORBISONIA, PENNSYLVANIA.

COMPOSITION BUILDING MATERIAL.

No. 821,550.  Specification of Letters Patent.  Patented May 22, 1906.

Application filed May 23, 1905. Serial No. 261,895.

*To all whom it may concern:*

Be it known that I, ZANE BLAND TAYLOR, a citizen of the United States, residing at Orbisonia, in the county of Huntingdon and State of Pennsylvania, have invented certain new and useful Improvements in Composition Building Material, of which the following is a specification.

My invention relates to a new composition of matter for the production of artificial stone; and it consists of certain ingredients or elements mixed together in certain proportions, as will be hereinafter fully set forth in this specification and briefly stated in the claims.

The main object of the invention is to produce an artificial stone possessing certain advantages and superior qualities which will well adapt it for the construction of buildings, monuments, pavements, tiling, doorsteps, &c.

Other objects of the invention, such as cheapness and durability, will become apparent upon a more complete disclosure thereof.

To produce my new composition, I take thirty-four per cent. of silica, twelve per cent. of alumina, fifty per cent. of lime, and four per cent. of magnesia, to which I add twenty per cent. of cement and twenty per cent. of clay, sand, or shale. These ingredients are thoroughly mixed in a pulverized or granular state, according to the purpose for which the composition is to be used, and a sufficient quantity of water and coloring-matter is added to produce a plastic mass of the desired consistency.

In carrying out my invention I prefer to utilize the metallic dross or refuse of furnaces (more particularly blast-furnaces,) commonly known as "slag," as it contains the ingredients or elements in substantially the same proportions I purpose to use in my composition. I crush the slag to the required degree by grinding the same in any approved mill or pulverizer, reducing the same, or a part thereof, to a powdered form, leaving, in instances where it is not desired to grind or crush the entire quantity of slag used, a part of it in nugget or granular form. After the slag has been crushed or otherwise reduced to the required degree, the cement and clay are added, and the whole composition thoroughly mixed by adding sufficient water to form a homogeneous plastic mass of the required consistency for the purpose intended. The composition in its plastic form is placed in molds of the desired shape and subjected to pressure and allowed to harden, when the articles thus formed will be ready for use.

It is well known that the per cent. or proportion of the component parts of slag varies—that is to say, the silica, alumina, lime, and magnesia vary in different ores—and in practicing my invention I supply the deficiency wherever it occurs by adding to the slag the additional amount of any ingredient that may be found by analysis to be below the per cent. or proportion required for the particular purpose in hand.

It is important that the component parts or ingredients of the composition herein described be mixed in substantially the proportions mentioned in order to produce a building material possessing the highly-desirable qualities and characteristics of strength and durability necessary and the characteristics that will render it impervious to water or dampness.

Having thus fully described my invention, what I claim is—

1. An artificial stone composed of thirty-four parts of silica; twelve parts of alumina; fifty parts of lime; four parts of magnesia; twenty parts of cement, and twenty parts of clay, and sufficient water to bring the mass to a plastic condition suitable for molding.

2. An artificial stone composed of thirty-four parts of silica; twelve parts of alumina; fifty parts of lime; four parts of magnesia; twenty parts of cement, and twenty parts of clay and sand, and sufficient water to reduce the mass to a plastic condition suitable for molding.

3. An artificial stone composed of sixty parts of crushed slag containing thirty-four parts of silica; twelve parts of alumina; fifty parts of lime, and four parts of magnesia; adding thereto twenty parts of cement, twenty parts of clay or clay and sand, and sufficient water to reduce the mass to a plastic condition, and a suitable coloring material.

In testimony whereof I affix my signature in presence of two witnesses.

ZANE BLAND TAYLOR.

Witnesses:
W. H. H. CARRIGAN,
D. L. McCLAIN.